United States Patent
Varier et al.

(10) Patent No.: US 7,324,553 B1
(45) Date of Patent: Jan. 29, 2008

(54) DYNAMIC BANDWIDTH MANAGEMENT RESPONSIVE TO ACCESS LINK STATE IN REDUNDANT NETWORK TOPOLOGIES

(75) Inventors: Roopesh R. Varier, Sunnyvale, CA (US); Guy Riddle, Los Gatos, CA (US); David Jacobson, Durham, NC (US)

(73) Assignee: Packeteer, Inc., Cupertino, CA (US)

( * ) Notice: Subject to any disclaimer, the term of this patent is extended or adjusted under 35 U.S.C. 154(b) by 841 days.

(21) Appl. No.: 10/676,631

(22) Filed: Sep. 30, 2003

(51) Int. Cl.
*H04J 3/16* (2006.01)
*H04L 12/28* (2006.01)
*G01R 31/08* (2006.01)

(52) U.S. Cl. .................. 370/468; 370/235; 370/395.2; 370/420

(58) Field of Classification Search ............... 370/229, 370/230, 231, 234, 235, 468, 395.1, 395.4, 370/420; 709/223, 225, 226, 229, 232
See application file for complete search history.

(56) References Cited

U.S. PATENT DOCUMENTS 6,097,722 A * 8/2000 Graham et al. ........ 370/395.21
6,493,317 B1 * 12/2002 Ma ............................ 370/237
7,065,048 B1 * 6/2006 Levy et al. .............. 370/230.1

* cited by examiner

*Primary Examiner*—Hanh Nguyen
(74) *Attorney, Agent, or Firm*—Mark James Spolyar

(57) ABSTRACT

Methods, apparatuses and systems allowing for dynamic bandwidth management schemes responsive to the state of a plurality of access links in redundant network topologies. In one embodiment, the present invention provides a bandwidth management device that periodically queries routing systems associated with access links, conceptually grouped into a virtual access link, to monitor that load of the access links and, depending on the detected load, adjust the configuration of the bandwidth management device to avoid overloading one or more of the access links. Embodiments of the present invention increases network efficiency and help network traffic to flow more smoothly with higher throughput. In one embodiment, the dynamic link control functionality is invoked when any given access link reaches a threshold capacity level. Assuming that network traffic will scale in the same ratio as presently observed, the present invention calculates the maximum traffic that can be let through so that no network interface or access link is overloaded.

21 Claims, 9 Drawing Sheets

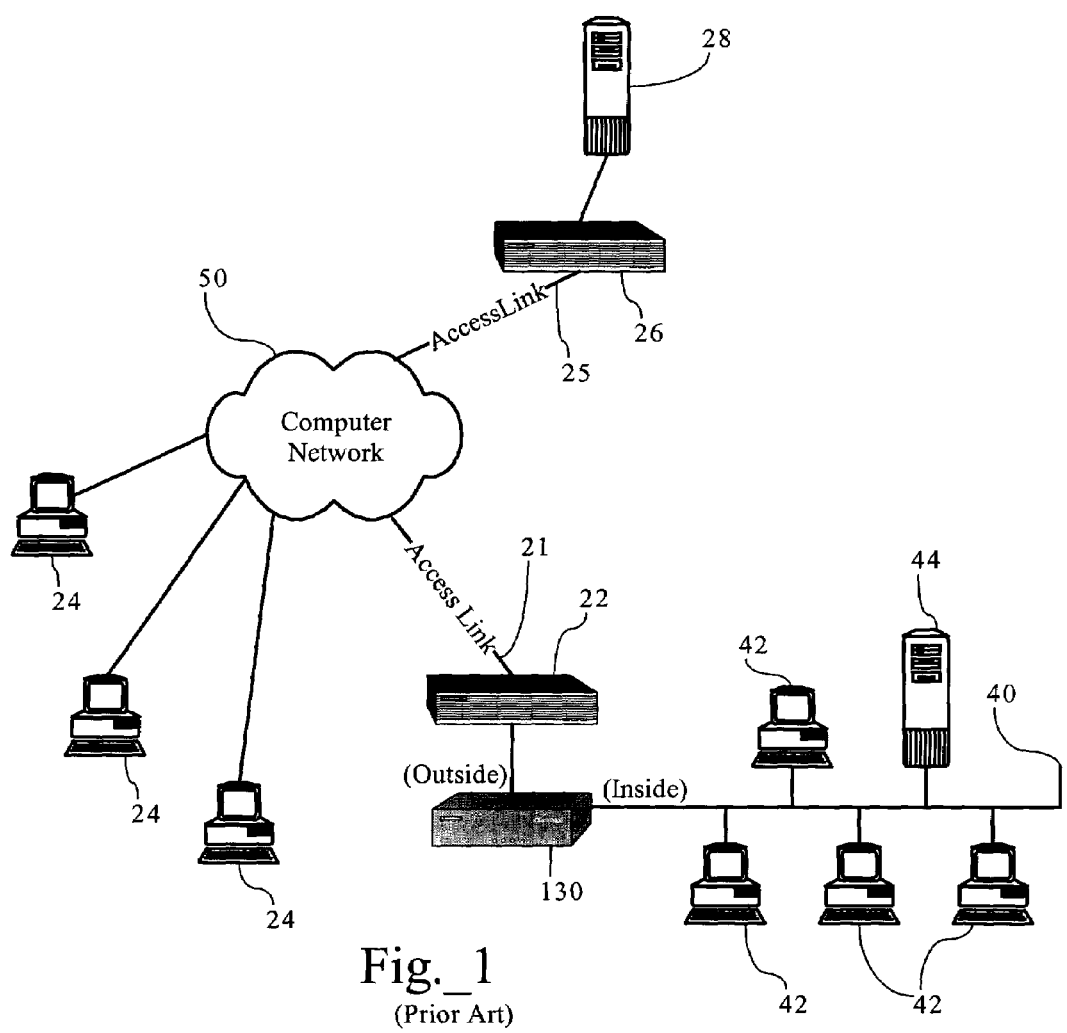
Fig._1
(Prior Art)

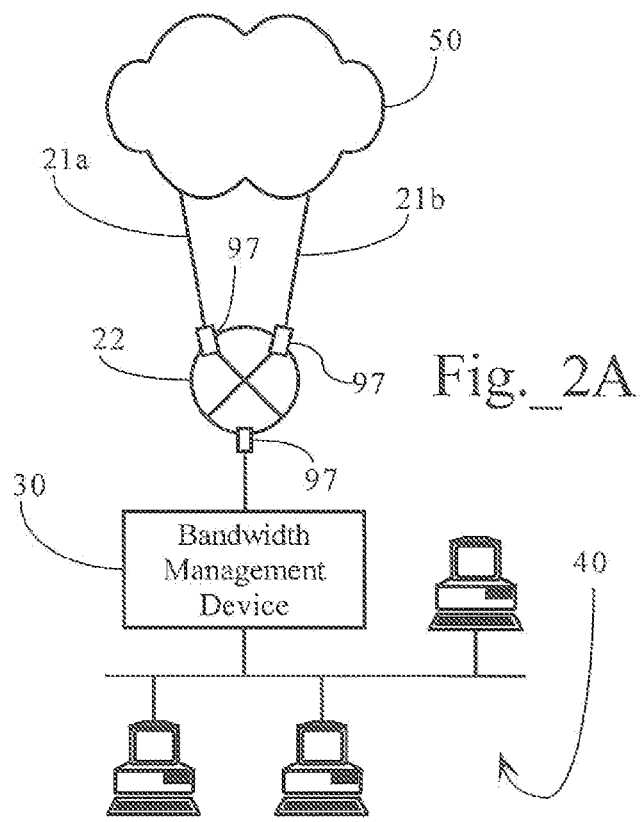
Fig._2A
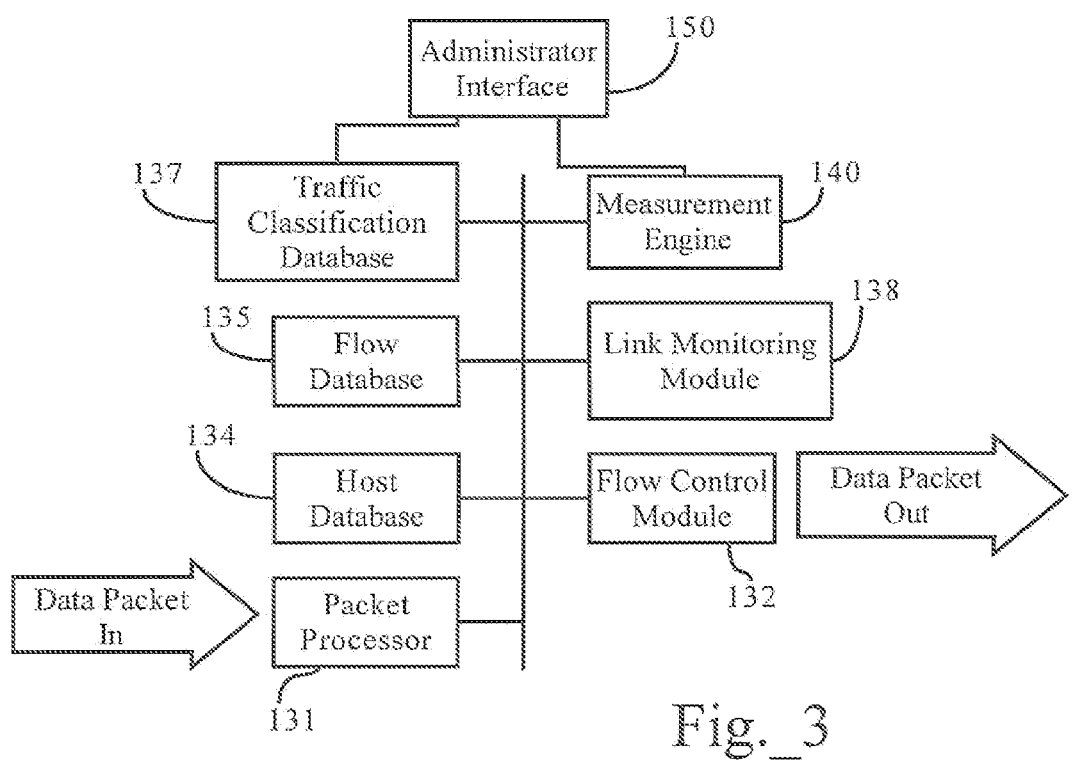
Fig._3

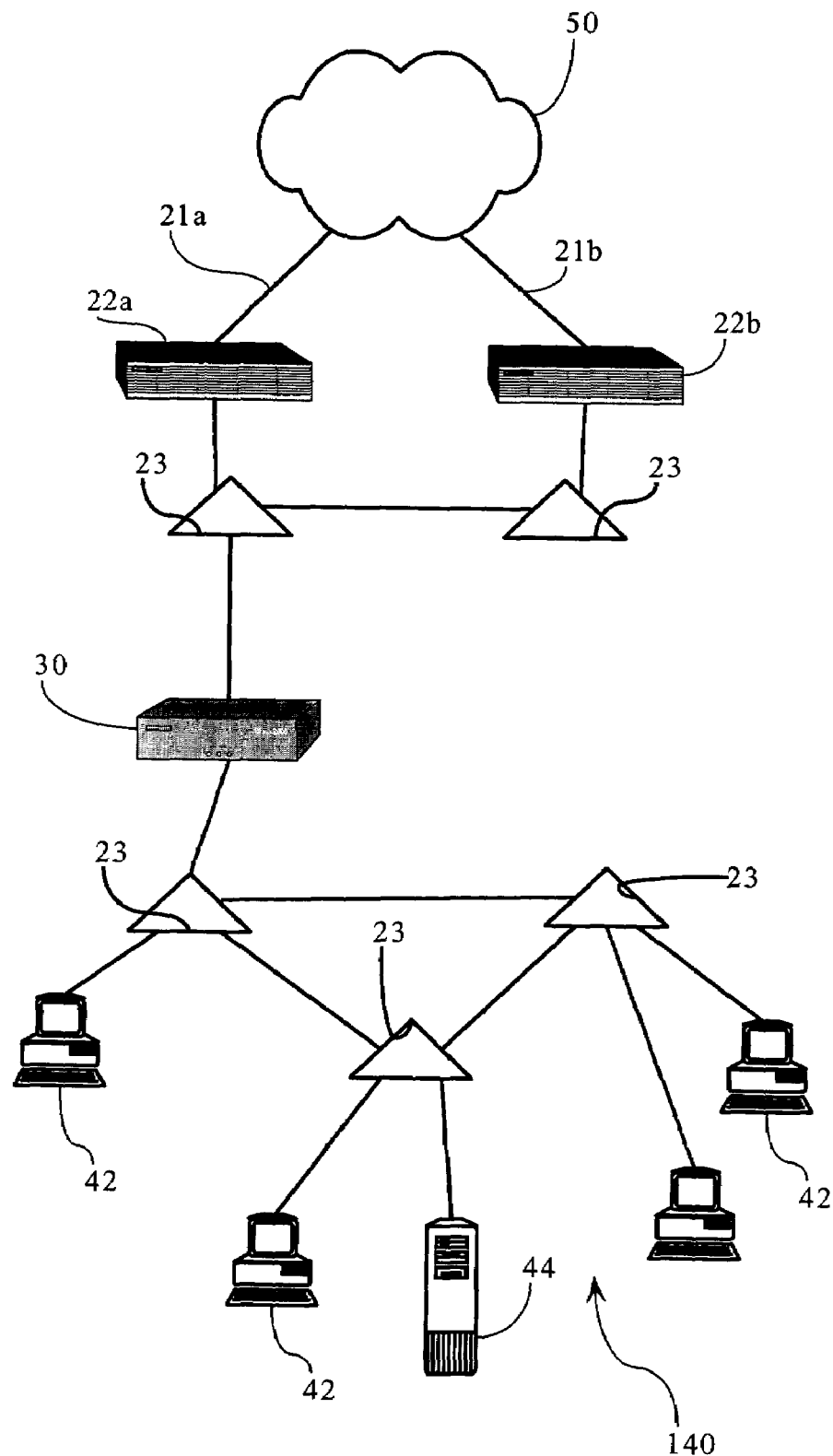
Fig._2B

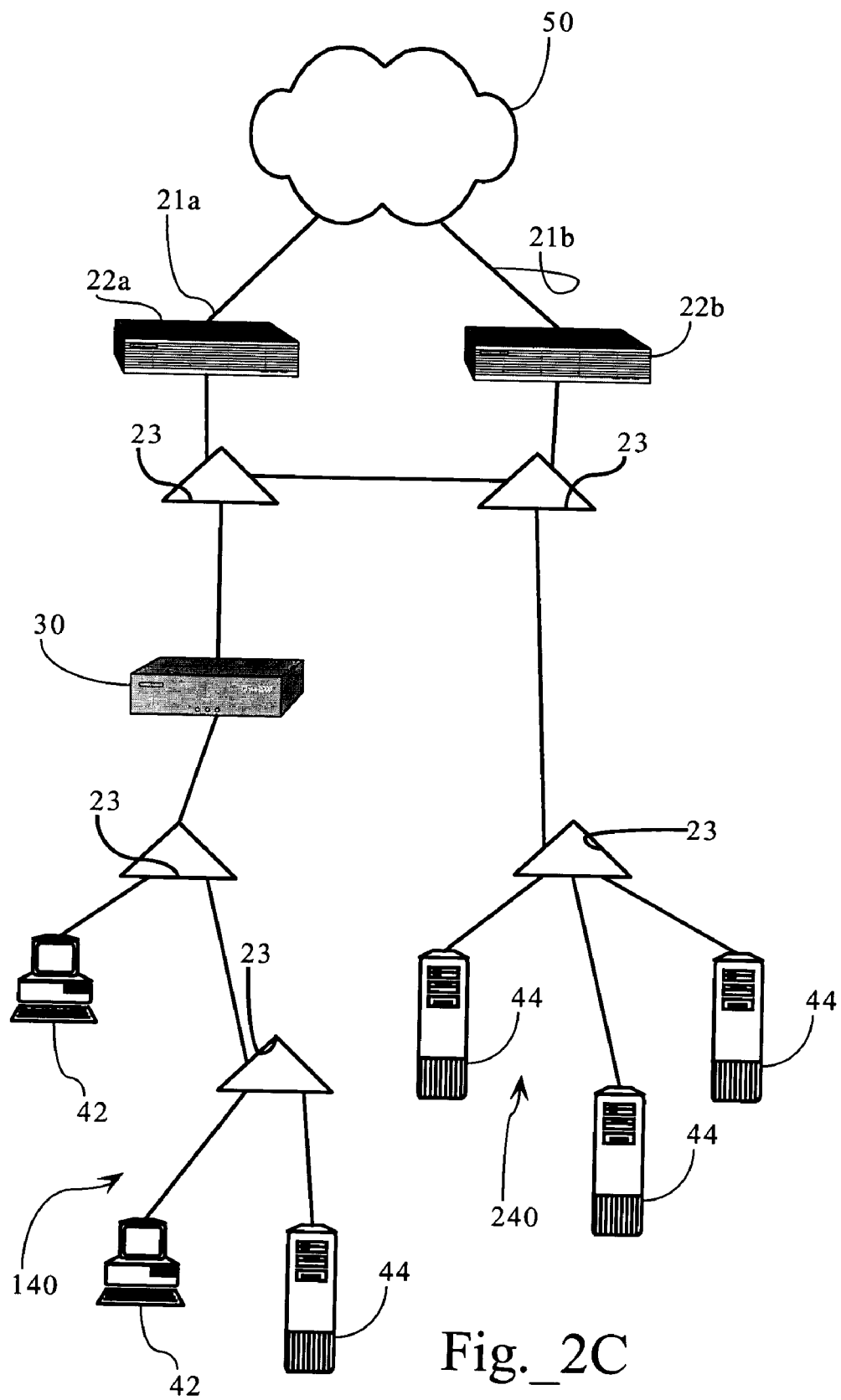
Fig._2C

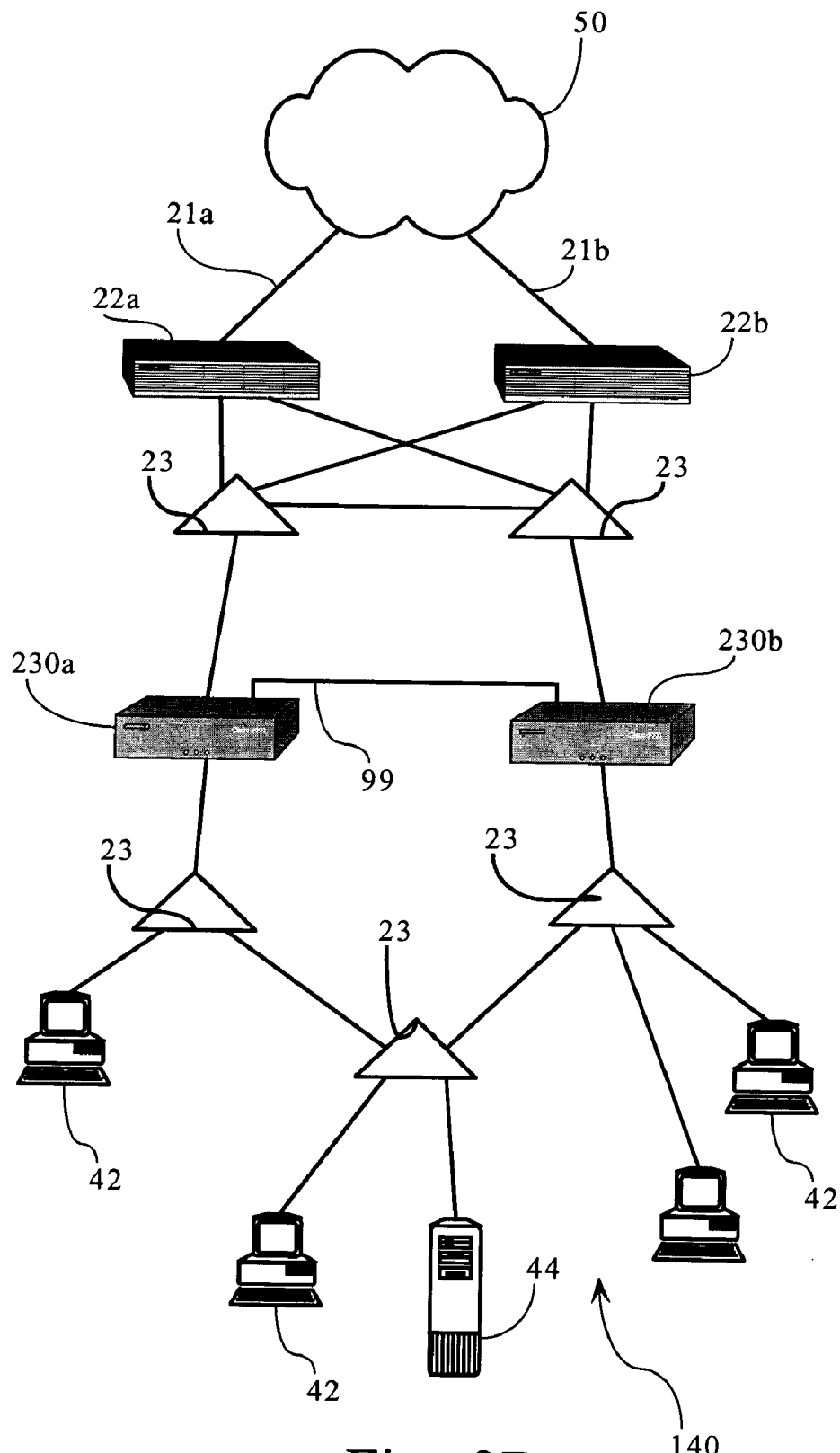
Fig._2D

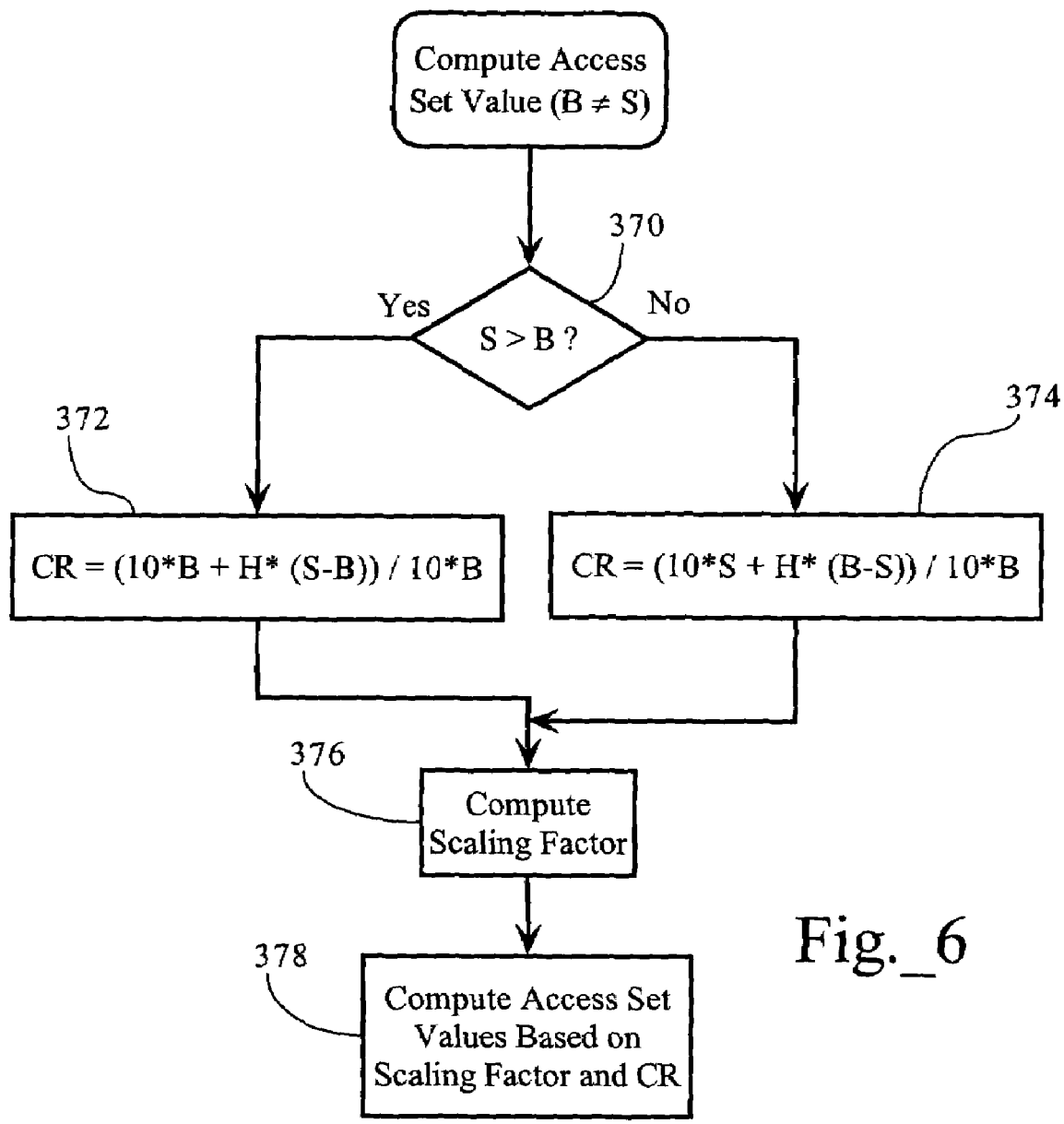
Fig._6

DYNAMIC BANDWIDTH MANAGEMENT RESPONSIVE TO ACCESS LINK STATE IN REDUNDANT NETWORK TOPOLOGIES

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120 in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936, in the name of Guy Riddle, Robert L. Packer and Mark Hill, entitled "Method for Automatically Classifying Traffic with Enhanced Hierarchy in a Packet Communications Network;"

U.S. patent application Ser. No. 10/177,518, in the name of Guy Riddle, entitled "Methods, Apparatuses and Systems Allowing for Progressive Network Resource Utilization Control Scheme;"

U.S. patent application Ser. No. 10/236,149, in the name of Brett Galloway and George Powers, entitled "Classification Data Structure enabling Multi-Dimensional Network Traffic Classification and Control Schemes;" and U.S. patent application Ser. No. 10/611,573, in the name of Roopesh Varier, David Jacobson, and Guy Riddle, entitled "Network Traffic Synchronization Mechanism."

FIELD OF THE INVENTION

The present invention relates to network bandwidth management and, more particularly, to methods, apparatuses and systems allowing for dynamic bandwidth management schemes responsive to the state of a plurality of access links in redundant network topologies.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

FIG. 1 illustrates a computer network environment including a bandwidth management device 130 deployed to manage network traffic traversing a single access link 21 connected to a open computer network 50, such as the Internet. With the increasing use and reliance on networks in business to accomplish daily tasks, efficiency, performance and reliability are key features of enterprise networks. For example, an important aspect of implementing enterprise-grade network environments is provisioning mechanisms that address or adjust to the failure of systems associated with or connected to the network environment, such as routers, switches and bandwidth management devices. Accordingly, many enterprise network architectures feature redundant topologies to provide for load balancing to maintain efficiency and performance, and fall-over support for reliability. For example, as FIG. 2A illustrates a typical enterprise network infrastructure may include a plurality of access links (e.g., 21a, 21b) connecting an enterprise LAN or WAN to an open computer network 50. In these network topologies, network traffic may be directed completely through one route or may be load-shared between alternative routes. FIG. 2B provides another redundant network topology where first and second routers 22a, 22b are connected to corresponding access links 21a, 21b and to a single bandwidth management device 30 via switches 23. In addition, FIG. 2C shows a redundant network topology similar to that shown in FIG. 2B; however, not all network traffic traversing the access links 21a, 21b encounters bandwidth management device 30. Still further, FIG. 2D illustrates a redundant network topology including redundant bandwidth management devices 230a, 230b configured with network traffic synchronization functionality, as disclosed in U.S. application Ser. No. 10/611,573. Of course, a wide variety of deployment scenarios and configurations are possible. Network devices, such as bandwidth management devices, that perform some network function must be configured to effectively respond to the behavioral characteristics associated with these increasingly complex network topologies.

According to the deployment scenario illustrated in FIG. 2A, bandwidth management device 30 manages network traffic traversing access links 21a, 21b in both the inbound (from network 50 to LAN 40) and outbound (from LAN 40 to network 50) directions. In the outbound direction, for example, bandwidth management device 30 emits network traffic to router 22, which routes and/or load balances the network traffic across access links 21a, 21b. For purposes of various rate control and bandwidth management computations (e.g., partitions, rate policies, minimum bandwidth guarantees, etc.), bandwidth management device 30 effectively treats access links 21a, 21b as one virtual link, whose size or capacity is the sum of the capacities of each access link 21a, 21b. Accordingly, if the maximum bandwidth of each access link was 50 Kbps, for example, the virtual link size would be 100 Kbps. This model further assumes that router 22 evenly distributes network traffic across access links 21a, 21b. This assumption-based model of the router's 22 behavior is also made in the other deployment scenarios illustrated in FIGS. 2B, 2C and 2D.

As to the deployment scenarios described above, however, this model of routing behavior often does not correctly characterize the manner in which a routing system, such as router 22 in FIG. 2A, routes and/or load balances traffic across multiple access links, such as 21a, 21b. For example, a routing system chooses a given access link based on considerations, such as best path to the destination host, in addition to load or other considerations. Accordingly, this often results in an uneven distribution of network traffic across access links 21a, 21b. This circumstance renders control of network traffic on a network-wide basis problematic, and without the present invention, may result in one or more access links or routers associated with a given access link becoming overloaded, reducing network efficiency resulting from retransmission of lost or dropped packets. For example, assume for didactic purposes that bandwidth management device 30 currently emits outbound network traffic (i.e., data flows sourced from local area network 40) at a rate of 55 Kbps, and that the network traffic load emitted from the router interface associated with access link 21a is 30 Kbps, while the network traffic emitted from the router interface associated with access link 21b is 25 Kbps. If the actual capacity of each access link is 40 Kbps, an assumption that the virtual link capacity is 80 Kbps may result in an overload condition for access link 21a, assuming that an increase in network traffic emitted from bandwidth management device is distributed consistently with the current ratio of 6:5. In fact, access link 21a will most likely become overloaded before the theoretical capacity of 80 Kbps is ever reached. Still further, the load at any given access link, as well as the distribution of network traffic across the access links, varies over time; therefore, the virtual link capacities computed by bandwidth management device 30 should preferably be dynamically adjusted depending on the current loading conditions observed on the network.

Furthermore, additional considerations are also present in the network topology illustrated in FIG. 2C, which includes a first network 140 and a second network 240, such as Demilitarized Zone (DMZ) comprising a plurality of web servers 44. In this network topology, second network 240 is essentially an additional source of network traffic (and, therefore, consumer of available bandwidth across access links 21a, 21b). Bandwidth management device 30, however, does not see the network traffic sourced from, or destined for, the second network 240 and, therefore, has no ability to account for it. This circumstance also breaks an additional assumption on which the virtual link capacity is derived according to prior art methodologies—namely, that the bandwidth management device, either individually or collectively with other devices, encounters all inbound and outbound network traffic.

In light of the foregoing, a need in the art exists for methods, apparatuses, and systems that allow bandwidth management and other network traffic control devices to adjust to respond to actually loading conditions across the network infrastructure. Embodiments of the present invention substantially fulfill these needs.

SUMMARY OF THE INVENTION

The present invention provides methods, apparatuses and systems allowing for dynamic bandwidth management schemes responsive to the state of a plurality of access links in redundant network topologies. In one embodiment, the present invention provides a bandwidth management device that periodically queries routing systems associated with access links, conceptually grouped into a virtual access link, to monitor that load of the access links and, depending on the detected load, adjusts the configuration of the bandwidth management device to avoid overloading one or more of the access links. Embodiments of the present invention increase network efficiency and help network traffic to flow more smoothly with higher throughput. In one embodiment, the dynamic link control functionality is invoked when any given access link reaches a threshold capacity level. Assuming that network traffic will scale in the same ratio as presently observed, the present invention calculates the maximum traffic that can be let through so that no network interface or access link is overloaded.

DESCRIPTION OF THE DRAWINGS

FIG. 1 is a functional block diagram illustrating a computer network environment including a bandwidth management device deployed in a non-redundant network environment including a single access link.

FIG. 2A is a functional block diagram illustrating a computer network environment including first and second access links 21a, 21b.

FIG. 2B is a functional block diagram illustrating a computer network environment including first and second routers 22a, 22b operably connected to access links 21a, 21b, and a bandwidth management device operative to manage data flows between computer network 50 and local area network 40.

FIG. 2C is a functional block diagram illustrating an alternative computer network environment including first and second local area computer networks 140 and 240, wherein bandwidth management device is deployed in the path between access links 21*a*, 21*b* and the first computer network 140.

FIG. 2D is a functional block diagram illustrating a computer network environment including redundant bandwidth management devices 230*a* and 230*b*.

FIG. 3 is a functional block diagram setting forth the functionality in a bandwidth management device according to an embodiment of the present invention.

FIG. 6 is a flow chart diagram illustrating a method directed to the computation of access set values in network environment including compression and/or bandwidth consumers whose flows traverse the access link(s) but not the bandwidth management device.

DESCRIPTION OF PREFERRED EMBODIMENT(S)

Figure 4A:
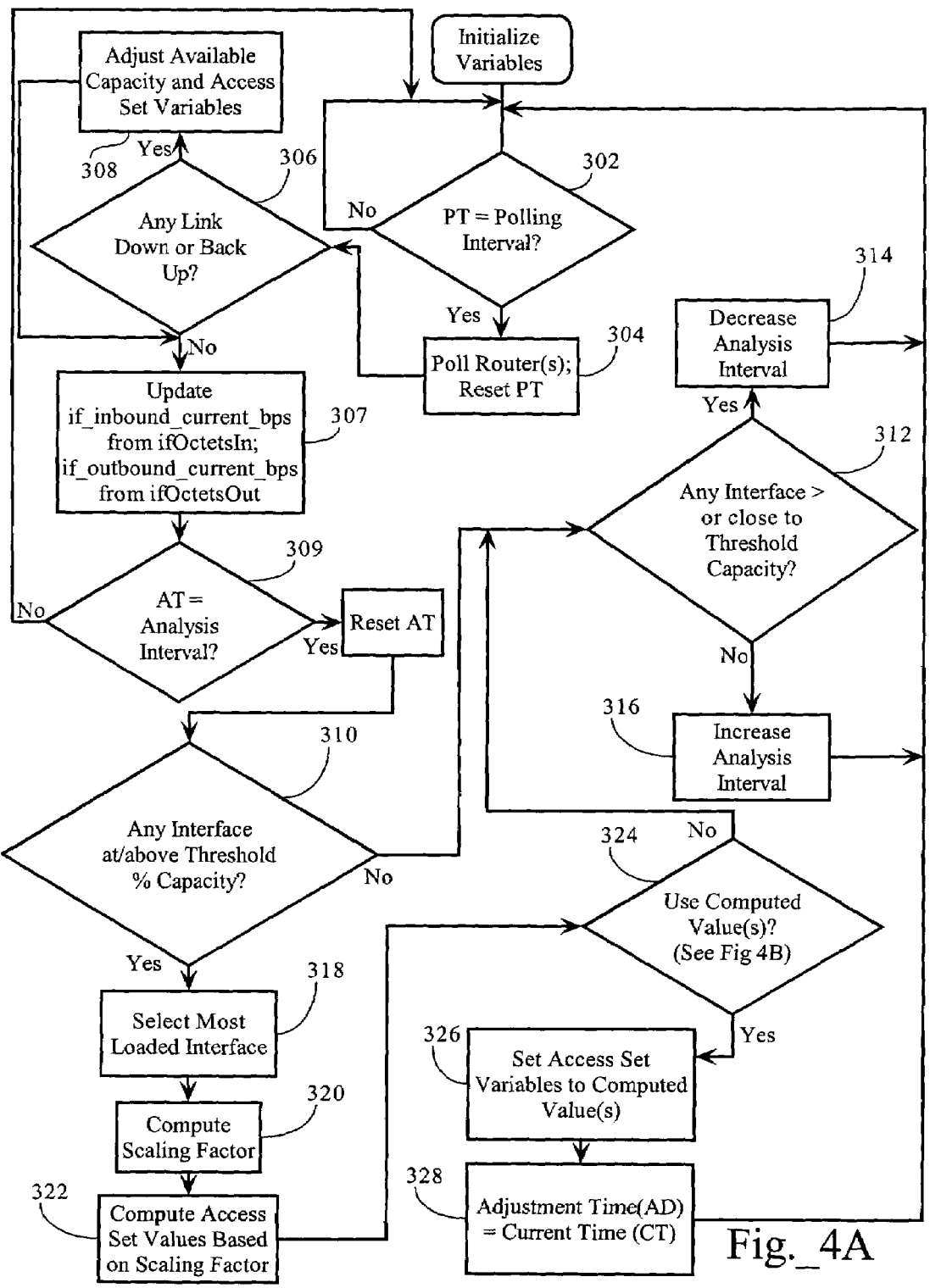
FIGS. 4A and 4B are flow chart diagrams illustrating a method directed to the link monitoring and adjustment functionality associated with an embodiment of the present invention.

FIGS. 2A, 2B, 2C and 2D illustrate various possible network environments in which embodiments of the present invention may operate. FIG. 2A illustrates a computer network environment where access links 21*a*, 21*b* are connected to separate interfaces 97 of the same router 22, which connects Local Area Network (LAN) 40 to computer network 50. As FIG. 2A shows, the network environment includes bandwidth management device 30 operatively connected to a communication path between LAN 40 and router 22. LAN 40 can be implemented by a variety of different network devices, such as Ethernet Switches, Bridges and Hubs. In addition, although FIG. 2A shows two access links 21*a*, 21*b*, router 22 can include additional interfaces to support additional access links. FIG. 2B provides a computer network environment including first and second routers 22*a*, 22*b* corresponding to respective access links 21*a*, 21*b*. As FIG. 2B illustrates, LAN switches 23 operably connect routers 22*a*, 22*b* to bandwidth management device 30 disposed on the path between access links 21*a*, 21*b* and computer network 140. In one embodiment, computer network 140 is an enterprise WAN comprising a plurality of LAN segments implemented by one or more Ethernet switches 23. FIG. 2C shows a computer network environment comprising first and second computer networks 140 and 240. As FIG. 2C illustrates, bandwidth management device 30 is disposed on the path between computer network 140 and access links 21*a*, 21*b*; however, bandwidth management device 30 does not encounter network traffic flowing between computer network 240 and computer network 50. Lastly, FIG. 2D sets forth a computer network environment featuring a redundant network topology, that includes first and second access links 21*a*, 21*b*; routers 22*a*, 22*b*; and network devices 30*a*, 30*b*. Access links 21*a*, 21*b* operably connect computer network 140 to computer network 50. Access links 21*a*, 21*b* may be uni-directional transmission lines or bi-directional transmission lines. Access links 21*a*, 21*b* may further support full-duplex data transmission or half-duplex data transmission. In one embodiment, computer network 50 is an open computer network, such as the Internet. Computer network 50, however, can be any suitable network, including a Local Area Network, a Wide Area Network, and the like. As one skilled in the art will recognize, the network topology can be expanded to include additional access links and associated network devices. LAN switches 23 include a plurality of ports to which end systems, such as client computers 42 and servers 44, and intermediate systems, such as routers and other switches, are connected. LAN switches 23 receive packets on a given port and forward the packets to other network devices on selected ports. In one embodiment, LAN switch 23 is an Ethernet-based (IEEE 802.3) switch.

FIG. 3 is a block diagram illustrating functionality, according to one embodiment of the present invention, included in bandwidth management device 30. In one embodiment, bandwidth management device 30 comprises packet processor 131, flow control module 132, measurement engine 140, traffic classification engine 137, link monitoring module 138, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 30, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Link monitoring module 138 monitors the state of access links grouped into a virtual link, and computes a virtual link capacity such that no individual access link becomes overloaded. Measurement engine 140 maintains measurement data relating to operation of bandwidth management device 30 to allow for monitoring of bandwidth utilization across access link 21 with respect to a plurality of bandwidth utilization and other network statistics on an aggregate and/or per-traffic-class level.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls (e.g., a partition, a policy, etc.), as well as configure parameters associated with partner bandwidth management devices. Administrator interface 150 also displays various views associated with a hierarchical traffic classification scheme and allows administrators to configure or revise the hierarchical traffic classification scheme. Administrator interface 150 can also be used to configure certain aspects of the link monitoring functionality described herein, such as providing the IP address and SNMP read community names for the routers or other routing systems to which the access links are connected. Administrator interface 150 can be a command line interface or a graphical user interface accessible, for example, through a conventional browser on client device 42.

A. Link Monitoring Functionality

Link monitoring module 138, as discussed above, is operative to monitor the state of access links 21*a*, 21*b* (e.g., the operational status and load of the links), and determine the maximum allowable aggregate inbound and/or outbound bandwidth for the virtual link (in one embodiment, the aggregation of access links 21a, 21b) to prevent any given access link from being overloaded. In one embodiment, link monitoring module 138 includes a monitoring demon that, when invoked, is operative to interact with one or more routers 22 to obtain the necessary link state information. As discussed below, the monitoring demon is configured to execute on a periodic basis (e.g., every 5 seconds, 30 seconds, etc.). As discussed below, this interval can be adjusted based on the link state information retrieved during a previous potting or analysis interval. The monitoring demon may also be configured to execute and invoke the monitoring functionality of link monitoring module 138 upon the receipt of an update command request from a remote device. A network administrator may also expressly invoke the update demon via administrator interface 150. As discussed below, link monitoring module 138 includes or utilizes SNMP, HTTP, FTP and/or any other suitable client functionality for establishing connections with remote devices (e.g., router 22).

For purposes of description, the operation of bandwidth management device 30 as deployed in the network environment illustrated in FIG. 2A is set forth below, except as otherwise stated herein. To monitor the state of access links 21a, 21b, bandwidth management device 30 periodically polls router 22 for information maintained in its management information base (MIB) for variables characterizing the status and load observed at each interface of router 22. In one embodiment, bandwidth management device 30 uses Simple Network Management Protocol (SNMP) queries to obtain the requisite information from router 22. In one embodiment, bandwidth management device 30 polls router 22 using the following MIB variables: 1) sysName, 2) ifName, 3) ifOperStatus, 4) ifSpeed, 5) sysUpTime, 6) ifInOctets, and 7) ifOutOctets. The sysName variable indicates the name of the router, while ifName identifies a given interface. In general, a sys* MIB variable are global to the router, while if* MIB variables repeat per installed interface. The ifOperStatus variable indicates whether a given interface is up or down. The ifSpeed variable indicates the link speed associated with a given interface, while the ifInOctets and ifOutOctets variables indicate the number of inbound and outbound bytes, respectively, seen on a given interface. The sysUpTime variable maintains a count of the time the router 22 has been up since initialization (e.g., power up, restart, etc.).

A.1. Configuration and Initialization

During deployment of bandwidth management device 30, a network administrator configures bandwidth management device 30, in one embodiment, with the IP address and SNMP read community name corresponding to router 22. In the other network topologies illustrated in FIGS. 2B, 2C and 2D, the network administrator would provide the IP addresses and SNMP read community names of routers 22a, 22b. In one embodiment, bandwidth management device 30 is configured to automatically run an SNMP walk of the MIB on router 22 to learn the interface identifiers (e.g., ifNames) corresponding to the interfaces, as well as their corresponding bandwidth capacity (e.g., ifSpeed) values. In another embodiment, a network administrator polls router 22 using SNMP queries and manually configures bandwidth management device 30 with the appropriate information.

In one embodiment, bandwidth management device 30 maintains a table, or a plurality of tables in a relational database, including the MIB variables set forth above, as well as the IP address and SNMP read community name associated with each router 22. In one embodiment, bandwidth management device 30 also maintains an if_inbound_bps variable and if_outbound_bps variable for each interface, indicating the capacity of the corresponding link in the inbound and outbound directions. In one embodiment, the values for the if_inbound_bps variable and if_outbound_bps variable are set to the link speed reported by the router 22 as indicated by the ifSpeed variable corresponding to the given interface. However, in one embodiment, a network administrator may override this automatic configuration and specify values less than, or greater than, the reported ifSpeed variable.

Bandwidth management device 30, in one embodiment, separately models the outbound and inbound capacity or aggregate link speed of access links 21a, 21b as Outbound and Inbound partitions, together such partitions model the available capacity of the Virtual Access Link in the inbound and outbound directions. In one embodiment, bandwidth management device 30 maintains certain parameter values associated with the Virtual Access Link. In one embodiment, bandwidth management device 30 maintains an Available Capacity set comprising 1) an available_inbound_capacity variable, which is the sum of the if_inbound_bps variables for all applicable interfaces, and 2) an available_outbound_capacity variable, which is the sum of the if_outbound_bps variables for all applicable interfaces. As discussed more fully below, link monitoring module 138 periodically adjusts these Available Capacity set variables in response to detected failures on one or more access links. In addition, bandwidth management device 30 also maintains so-called "Access Set" variables, outbound_access_bps and inbound_access_bps, which define the Outbound and Inbound Partition sizes actually used in connection with computing rate control and other bandwidth management parameters by rate control module 132. The Access Set variables are initially derived from the Available Capacity variables discussed above. Upon initialization of bandwidth management device 30, the outbound_access_bps variable is set to available_outbound_capacity variable, while the inbound_access_bps variable is set to available_inbound_capacity variable. As discussed more fully below, however, the bandwidth management device 30 adjusts the values of outbound_access_bps and inbound_access_bps in response to loading conditions detected at the interfaces associated with access links 21a, 21b.

A.2. Basic Operation

Figure 4B:
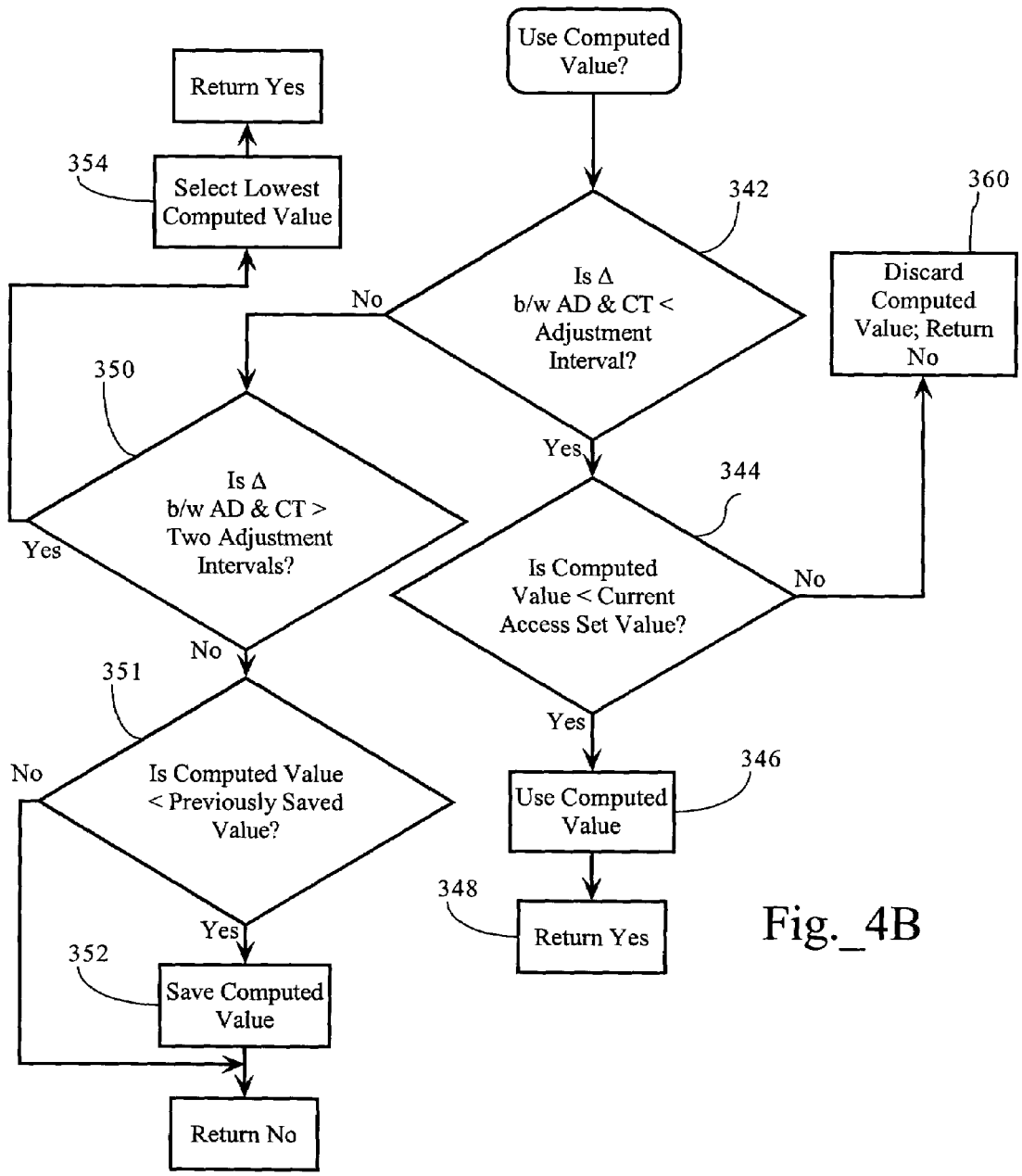

FIGS. 4A and 4B illustrate operation of link monitoring module 138 according to an embodiment of the present invention. As FIG. 4A illustrates, link monitoring module 138 polls one or more routers for access link state information at a frequency defined by a polling interval (302), and analyzes the access link state information at a periodic analysis interval (309). In another embodiment, link monitoring module 138 analyzes the access link state information at each polling interval. As FIG. 4A illustrates, link monitoring module 138 polls one or more routers (304) on a periodic basis defined by a polling interval (302). In one embodiment, link monitoring module 138 polls router 22, using the IP address of the router and ifIndex variables in SNMP queries, for the following MIB variables: 1) sysUpTime; 2) ifName, and (for each interface connected to an access link (e.g., access links 21a, 21b)), 3) ifOperStatus, 4) ifOctetsIn, and 5) ifOctetsOut. Using the value of the ifOperStatus variable, link monitoring module 138 then determines whether any interface (and associated access link) is down, or whether an interface that was previously down is again operational (306). If one or more links are down, link monitoring module 138 adjusts appropriate Available Capacity variables. For example, if a given access link is down, link monitoring module 138 recomputes the Available Capacity variables over the working access links. As FIG. 4A illustrates, link monitoring module 138 then adjusts computes new Access Set variables (308), as discussed more fully below, omitting the down link(s) from the computation(s).

As FIG. 4A illustrates, link monitoring module 138 also computes the average inbound bandwidth (if_inbound_current_bps) and average outbound bandwidth (if_outbound_current_bps) observed at each interface during the polling interval (307). As discussed above, link monitoring module 138 obtains, for each interface, the ifOctetsIn and ifOctetsOut counts, as well as the sysUpTime corresponding to the ifOctetsIn and ifOctetsOut counts, and stores them in memory, such as a table or other data structure. The average bandwidth consumption at a given link over the current polling interval, in both the inbound and outbound directions, can be derived by comparing the current values with the values returned by the polled router during the previous polling interval. For example, to compute the average inbound bandwidth at a given interface (if_inbound_current_ bps), link monitoring module 138 subtracts the previous ifOctetsIn value from the current ifOctetsIn value, obtaining the octets received over the polling interval, and divide this value by the difference between the current sysUpTime value and the previous sysUpTime value. Average outbound bandwidth (if_outbound_current_bps) over the monitoring interval is computed in a similar manner. In one embodiment, the polling intervals are sufficiently small to compute weighted moving averages or exponential weighted moving averages of the inbound and outbound bandwidth at each interface over the analysis interval. According to one embodiment, the average outbound and inbound bandwidth computations are smoothed by using an exponential weighted moving average (EWMA), whose values at various polling intervals may be recorded in measurement engine 140 for historical reference purposes.

As FIG. 4A shows, periodically at each analysis interval (309), link monitoring module 138 determines whether one or more Access Set variables requires re-computation. In one embodiment, at the end of each analysis interval (309), link monitoring module 138 determines whether the inbound and/or outbound bandwidth observed at any interface is at, or above, a threshold percentage level of the interface capacity (310). Link monitoring module 138, in one embodiment, compares the average bandwidth value (if_inbound_current_bps and/or if_outbound_current_bps) to the capacity of the interface, if_inbound_bps for the inbound determinations (or if_outbound_bps, for outbound direction determinations). In one embodiment, if the average bandwidth of any interface during the analysis interval is above a threshold percentage (e.g., 25 percent) of the capacity of that interface (310), link monitoring module 138 computes new Access Set variables, as discussed more fully below. As one skilled in the art will recognize, the operation of link monitoring module 138 operates essentially in an independent manner relative to computing the Inbound and Outbound partition values in the Access Set, in that these Access Set values are derived from different, independent parameters. In addition, the present invention can be applied solely to adjust the Inbound partition, the Outbound partition, or both.

As FIG. 4A illustrates, link monitoring module 138, in one embodiment, also adjusts the analysis interval and, thus, the possible frequency of adjustments to the Access Set variables depending on the proximity of the average bandwidth at any given interface to the threshold percentage capacity. In one embodiment, if the bandwidth at the most proportionally loaded interface is above a threshold percentage capacity, FTu (312), link monitoring module 138 decreases the analysis interval by a predetermined value, FIu (314). In one embodiment, the analysis interval can be repeatedly decreased down to a predetermined minimum value. In one embodiment, link monitoring module 138 increases the analysis interval (316), if the bandwidth observed at the most proportionally loaded interface is below another percentage threshold, FTd (e.g., less than 15% of threshold capacity). Similarly to decreasing the analysis interval, the analysis interval can be repeatedly increased by a percentage FId up to a maximum value. The polling interval can be adjusted in a similar manner in response to the bandwidth observed at an interface either crossing the threshold percentage capacity or approaching the threshold percentage capacity.

If any interface exceeds the threshold percentage capacity (310), link monitoring module 138 then computes one or more new Access Set values based on the loading conditions observed at the interfaces. As discussed above, computing Access Set values for the inbound and outbound partitions are performed separately; in fact, the observations with respect to inbound network traffic may cause corresponding Access Set values to be re-computed, while the outbound Access Set values remain unchanged. Link monitoring module 138, in one embodiment, selects the most proportionally loaded interface—i.e., the interface at which the highest bandwidth as a percentage of overall capacity was observed—(318), and computes a scaling factor by which the appropriate outbound or inbound Access Set value should be adjusted. For example, and in one embodiment, link monitoring module 138 can calculate a new outbound partition value for the Access Set by comparing the observed outbound bandwidth at the most proportionally loaded interface to the capacity of that interface. The scaling factor is set to the ratio between these values (i.e. bandwidth capacity to bandwidth observed at most proportionally loaded interface). A new outbound partition value is computed based on the load (in terms of bandwidth) that is required to reach the maximum capacity of the selected (most proportionally loaded) interface, given the computed scaling factor.

To illustrate the following, assume for didactic purposes that a first interface, if0, has a capacity of 60 Kbps and a second interface, if1, has a capacity of 128 Kbps. Accordingly, both the Inbound (available_inbound_capacity) and Outbound (available_outbound_capacity) values in the Available Capacity set are set to 188 Kbps (60 k+128 k=188 k), assuming a network administrator has not manually configured lower or higher values. In addition, the corresponding Access Set values, outbound_access_bps and inbound_access_bps, are initially set to the same values (188 Kbps). In one embodiment, the initial Access Set values are set slightly lower to avoid the potential for overloading an interface before computation of new Access Set values. Further assume that, at a given point in time, the inbound bandwidth observed at interface if0 is 30 Kbps, while the bandwidth observed at interface if1 is 25 Kbps. Accordingly, if the percentage threshold is 25%, the observed inbound bandwidth at interface if0 has crossed that threshold, which causes link monitoring module 138 to compute a new Access Set value for inbound_access_bps. Accordingly, to compute the required adjustment, link monitoring module 138 selects the most proportionally loaded interface (here, interface if0) and compares the load observed at interface if0 to the bandwidth capacity of interface if0. Here, the scaling factor would be 2 to 1, derived from 60 Kbps over 30 Kbps. Link monitoring module 138 then computes the aggregate bandwidth across all interfaces that will result in the interface if0 being at maximum capacity given the scaling factor. In this example, the computed value for inbound_access_bps would be product of the scaling factor (here, 2) and the aggregate bandwidth observed at the interfaces (here, 55 Kbps), which yields 110 Kbps. Assuming that additional load across the access links in the aggregate scales in the same current proportion between the interfaces if0 and if1, setting inbound_access_bps to this value ensures that interface if0 does not become overloaded. One skilled in the art will recognize that the scaling factor, as well as the proportion/distribution of network traffic across the interfaces (an assumption on which the computation is based), will also vary dynamically through the analysis intervals and, therefore, adjust to differing loading conditions. In addition, by configuring the analysis interval, either empirically or heuristically, to a sufficiently small value, this assumption and the scaling factor can be safely applied. As discussed above, the outbound partition value in the Access Set can be computed in a similar manner.

As FIG. 4A illustrates, any new Access Set values are not automatically used; rather, and in one embodiment, link monitoring module 138 applies one or more criterion to determine whether to apply the new computed values to the Access Set parameters (324). In one embodiment, link monitoring module 138 compares the newly computed Access Set value to the currently effective Access Set value. In one embodiment, if the difference between these values is more then K percent (e.g., 3 percent) of the currently effective Access Set value, the newly computed value is applied. In another embodiment, if the newly computed value is less than the currently effective value, link monitoring module 138 applies the newly computed Access Set value; however, if the newly computed value is greater than the currently effective Access Set value, link monitoring module 138 uses the threshold percentage difference between the values (above) to determine whether to apply the newly computed value. Of course, one skilled in the art will recognize that a variety of decisional criteria can be used.

In the computer network environment illustrated in FIG. 2D, bandwidth management devices 230a and 230b can operate essentially in the same manner. In one embodiment, one of bandwidth management devices 230a, 230b is configured to have link monitoring module 138 enabled, while the link monitoring module on the other device is disabled. In such a configuration, the active link monitoring module shares the computed Access Set values with the disabled link monitoring module. Otherwise, bandwidth management devices 230a, 230b operate as described herein and in U.S. application Ser. No. 10/611,573.

A.3. Adjustment Scheme—Compression/Other Bandwidth Consumers

In an alternative embodiment, link monitoring module 138 is responsive to more complex network loading conditions and situations, where a one-to-one correlation may not exist between the network traffic emitted or received by bandwidth management device 30 and the network traffic observed at the router interfaces associated with access links 21a, 21b. For example, as described above, the network environment depicted in FIG. 2C may result in observed aggregate bandwidth across the router interfaces being greater than the bandwidth associated with network traffic emitted by bandwidth management device 30. In other network infrastructures, the routers may perform compression resulting, for example, in less outbound data throughput at the router interfaces than the outbound data emitted from bandwidth management device 30.

For didactic purposes, let:
1) S=actual observed bandwidth management device 30 (in one embodiment, the value of S is smoothed via EWMA);
2) B=observed aggregate inbound or outbound bandwidth at router interfaces (in one embodiment, the value of B is smoothed via EWMA); and
3) H=headroom at the most proportionally loaded interface and is the difference in percent between the capacity of the interface and the current observed bandwidth (in one embodiment, H is capped at Z ($0 \leq H \leq Z$; in one embodiment, Z=20).

FIG. 6 is a flow chart illustrating the computation of an inbound or outbound Access Set value where S, the bandwidth observed at bandwidth management device 30, does not equal B, the observed aggregate bandwidth at the router interfaces. If B=S (or if B is within a threshold range of S), then the Access Set values are computed as discussed above. Otherwise, if B≠S (or if B is not within a threshold range of S), link monitoring module 138 computes a capacity ratio, CR. As FIG. 6 illustrates, if S is greater than B (370), then $$CR=(Z*B+H*(S-B))/(Z*B) \qquad (372).$$

Otherwise, if B is greater than S, then $$CR=(Z*S+H*(B-S))/(Z*B) \qquad (374).$$

The scaling factor is computed as discussed above based on the observed bandwidth and capacity of the most proportionately loaded interface (376). The new Access Set value is then computed based on the scaling factor and the capacity ratio, CR (378). That is, the computed value for the Access Set is the product of the current aggregate bandwidth (inbound or outbound), the scaling factor and the capacity ratio (CR). Use of the capacity ratio as computed above addresses the circumstances, discussed above, where there is compression and/or other, unaccounted-for bandwidth consumers impacting the load at the router interfaces. Furthermore, one skilled in the art will recognize that the constants in the above equation can be adjusted to achieve different behaviors.

Additionally, the comparison set forth in box 310 of FIG. 4A includes the additional, alternative check to determine whether B (observed aggregate inbound or outbound bandwidth at router interfaces) is within a threshold range of S (actual observed bandwidth at bandwidth management device). According to such an embodiment, the Access Set values would be recomputed if any interface was above a threshold capacity, or B was not within a threshold range of S. Except for the changes discussed above and illustrated in FIG. 6, the method illustrated in FIG. 4A can be employed to adjust the Access Set values. However, as to the decisional criteria of whether to use the newly computed Access Set value, if the computed value differs from the current Access Set values by more than K percent, the new Access Set value is set to the current value, plus or minus K/N percent of the current Access Set value (where N is a constant, such as 2) depending on whether the new computed value is larger (increasing the Access Set value) or smaller (decreasing the Access Set value) than the current value. Of course, other techniques can be employed to prevent abrupt or steep changes to the Access Set value.

A.4. Adjustment Scheme—Use of Adjustment Interval

FIG. 4B illustrates the decisional criteria associated with an alternative embodiment of the present invention. In one embodiment, determinations as to whether to use a computed outbound or inbound Access Set value are made relative to an adjustment interval. For didactic purposes, assume an adjustment interval of 7 seconds. As FIG. 4B illustrates, link monitoring module 138, in one embodiment, compares the difference, Δ, in time at which the inbound or outbound Access Set value was last adjusted, AT, and the current time to the adjustment interval (342). If the difference Δ is less than the adjustment interval (342) and the computed Access Set value is smaller than the current Access Set value (344), the Access Set value is set to the newly computed value (346). As FIG. 4B shows, in one embodiment, within the first adjustment interval immediately after the Access Set value has been updated, any new Access Set value that is larger than the current access capacity is discarded (344, 360). As FIG. 4B illustrates, if the time difference Δ is within a second adjustment interval (350), any new Access Set value that is lower than a previously saved value (351) is stored (352). In one embodiment, after a second adjustment interval (350), link monitoring module selects the lowest computed Access Set value (354) to prevent potentially drastic changes in the Inbound or Outbound Access Set values. Of course, other thresholds, adjustment intervals and decisional criteria can be used to achieve a variety of behavioral configurations for link monitoring module 138 and, thus, bandwidth management device 30.

B. Remaining Bandwidth Management Device Functionality

The above-identified, commonly-owned patents and patent applications disclose the functionality and operation of bandwidth management devices. As discussed herein, bandwidth management device 30 is operative to classify data flows and, depending on the classification, enforce respective bandwidth utilization controls on the data flows to control bandwidth utilization and optimize network application performance across access links 21a, 21b.

B.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Packet processor 131, in one embodiment, reserves memory space in the dynamic memory pool for storing such variably-sized attribute information as flows traverse bandwidth management device 30. Packet processor 131 writes the attributes in the dynamic memory pool and, if it runs out of memory, reports to the management information base 138 that it ran out of memory and returns the service type ID (see below) identified at the point when memory ran out.

Packet processor 131 also stores received packets in a buffer structure for processing. In one embodiment, the packets are stored in the buffer structure with a wrapper including various information fields, such as the time the packet was received, and the packet flow direction (inbound or outbound).

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.) and 5) default bandwidth management policy. A service aggregate encompasses a combination of individual services (each including different matching criteria, such as different port numbers, etc.) corresponding to the service aggregate. When bandwidth management device 30 encounters a new flow, packet processor 131 analyses the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing an access link. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

As discussed above, relative to flow control module 132, the available bandwidth across access links 21a, 21b is aggregated and treated essentially as a single virtual link. In one embodiment, the single virtual link is modeled as an Inbound partition for inbound flows, and an Outbound partition for outbound flows. As discussed below, partitions configured by a network administrator are child partitions of these two root patterns. In one embodiment, the Inbound partition size is equal to the value of inbound_access_bps, while the Outbound partition size is equal to the value of outbound_access_bps. As discussed above, the link monitoring module 138 monitors the state of the access links and adjusts the Outbound and/or Inbound partition sizes as required to prevent overloading any given interface. By controlling the Outbound partition size, link monitoring module 138 effectively controls the aggregate bandwidth or load that flow control module 132 places on access links 21a, 21b by controlling the amount of network traffic emitted. Controlling the Inbound partition size, influences the target rates which flow control module 132 allocates to various inbound data flows.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees.

Traffic classification database 137 stores traffic classes associated with data flows that traverse access link 21. Traffic classification database 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.4. Enforcement of Bandwidth Utilization Controls

Figure 5:
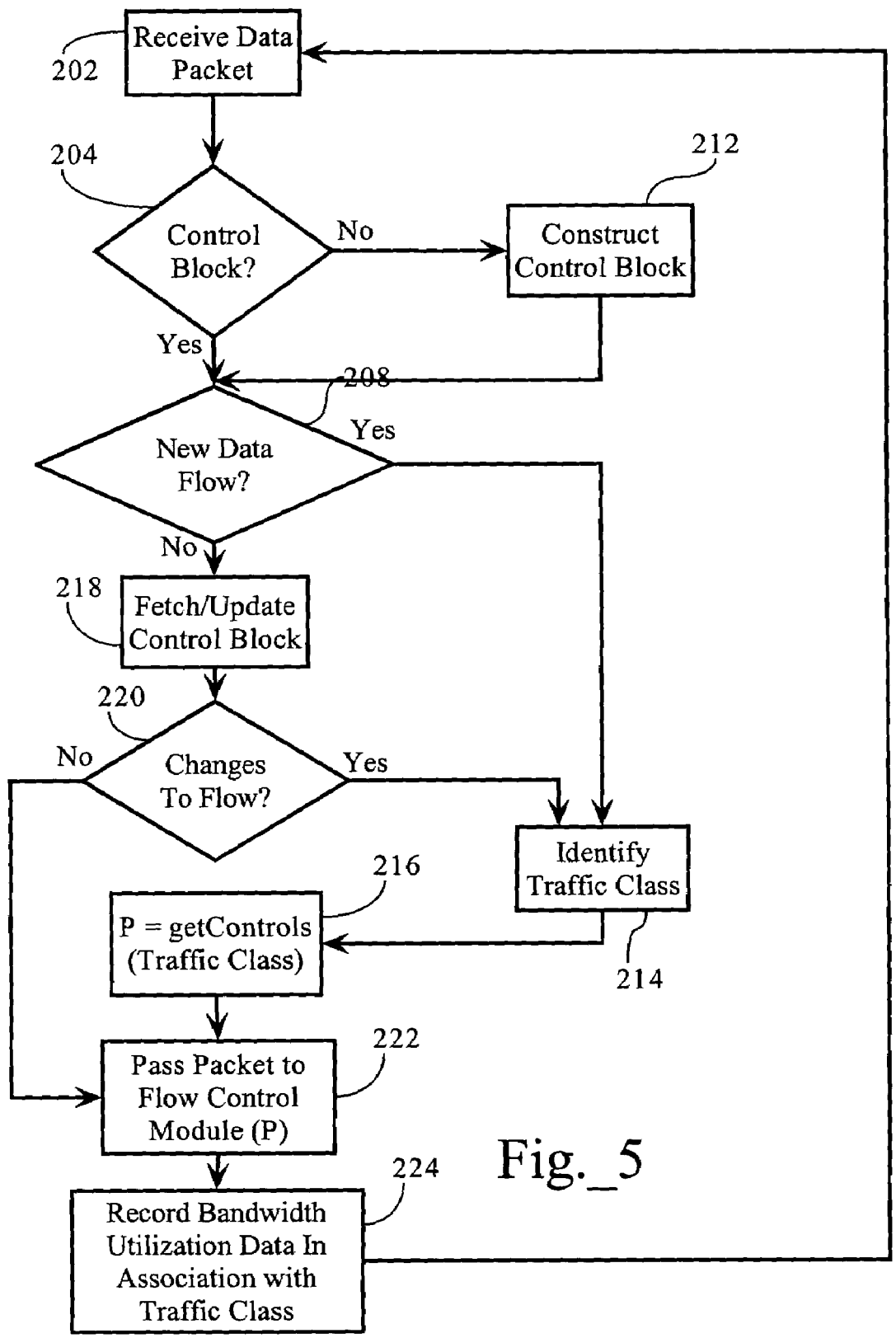
FIG. 5 is a flow chart diagram illustrating a method directed to enforcement of bandwidth utilization controls on network traffic traversing access links 21*a*, 21*b*.

FIG. 5 illustrates a method, according to one embodiment of the present invention, directed to the enforcement of bandwidth utilization controls on data flows transmitted across access link 21 and, therefore, traversing bandwidth management device 30. The method for enforcing bandwidth utilization controls, however, is not critical to the present invention; any suitable method can be employed.

In one embodiment, packet processor 131 receives a data packet (FIG. 5, 202) and determines whether flow database 135 contains an existing control block object corresponding to the data flow (204) (see Section B.1., supra). If no control block object corresponds to the data packet, packet processor 131 constructs a control block object including attributes characterizing the data flow, such as service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 5 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 5 minutes). If the difference between the time of the latest packet and the time of the last packet is greater than the threshold, the new packet is deemed part of the new flow. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the data packet does not signify a new data flow, packet processor 131 retrieves the control block object, updates various attributes (e.g., last packet time, packet count, etc.), and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes.

Rate control module 132 then accesses the control block object corresponding to the data flow to retrieve the bandwidth utilization or other controls (e.g., partition, policy, security controls, etc.) associated with the traffic class and enforces the bandwidth utilization controls on the data packet flow (222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (224) to allow for analysis of bandwidth utilization and other network statistics on a traffic class, access link, and/or partition level.

Lastly, although the present invention has been described as operating in connection with end systems and networks employing the HTTP, TCP and IP protocols, the present invention has application in computer network environments employing any suitable session layer, transport layer and network layer protocols. Moreover, while embodiments of the present invention have been described as operating in connection with two access links, the present invention can be applied to network environments including any number of redundant access links. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating bandwidth management across a plurality of access links, comprising monitoring bandwidth utilization at a plurality of interfaces in at least one routing system, wherein the plurality of interfaces are operably connected to respective access links;

selecting an interface of the plurality of interfaces having the highest bandwidth utilization relative to a corresponding bandwidth capacity of the selected interface;

computing a scaling factor comprising the ratio of the bandwidth capacity to the bandwidth utilization of the selected interface; and computing a virtual bandwidth limit by multiplying the scaling factor by the aggregate bandwidth utilization detected across the plurality of interfaces.

2. The method of claim 1 further comprising:

configuring a bandwidth management device to enforce the virtual bandwidth limit across data flows traversing the interfaces, wherein the bandwidth management device is operably connected to a communication path between a network and the access links.

3. The method of claim 1 wherein the bandwidth utilization is inbound bandwidth utilization and the virtual bandwidth limit is an inbound virtual bandwidth limit.

4. The method of claim 1 wherein the bandwidth utilization is outbound bandwidth utilization and the virtual bandwidth limit is an outbound virtual bandwidth limit.

5. The method of claim 1 further comprising comparing the aggregate bandwidth utilization observed at the plurality of interfaces to the aggregate bandwidth utilization observed at a bandwidth management device operably connected to a communication path between a network and the access links.

6. The method of claim 5 further comprising adjusting the virtual bandwidth limit based on the difference between the aggregate bandwidth utilization observed at the plurality of interfaces to the aggregate bandwidth utilization observed at a bandwidth management device operably connected to a communication path between the network and the access links.

7. The method of claim 5 further comprising reducing the virtual bandwidth limit if the aggregate bandwidth utilization observed at the plurality of interfaces is greater than the aggregate bandwidth utilization observed at a bandwidth management device operably connected to a communication path between the network and the access links.

8. The method of claim 5 further comprising
increasing the virtual bandwidth limit if the aggregate bandwidth utilization observed at the plurality of interfaces is less than the aggregate bandwidth utilization observed at a bandwidth management device operably connected to a communication path between the network and the access links.

9. The method of claim 1 further comprising
comparing the computed virtual bandwidth limit to a virtual bandwidth limit currently configured on a bandwidth management device, wherein the bandwidth management device is operably connected to a communication path between a network and the access links; and
configuring a bandwidth management device to implement the computed virtual bandwidth limit, if the difference between the computed virtual bandwidth limit and the currently configured virtual bandwidth limit does not exceed a threshold value.

10. In a computer network environment comprising plurality of access links operably connected to respective interfaces of at least one routing system, wherein the plurality of interfaces are associated with a virtual access link, a method preventing overloading any of the interfaces, the method comprising
monitoring bandwidth utilization at the interfaces associated with the plurality of access links;
selecting an interface of the plurality of interfaces having the highest bandwidth utilization relative to a corresponding bandwidth capacity of the selected interface;
computing a scaling factor comprising the ratio of the bandwidth capacity to the bandwidth utilization of the selected interface; and
computing a virtual bandwidth limit for the virtual access link by multiplying the scaling factor by the aggregate bandwidth utilization detected across the plurality of interfaces; and
utilizing the computed virtual bandwidth limit in controlling data flows encountered at the plurality of interfaces associated with the virtual access link.

11. The method of claim 10 wherein the monitored bandwidth utilization is the inbound bandwidth utilization at the interfaces; and wherein the bandwidth limit is an inbound bandwidth limit.

12. The method of claim 10 wherein the monitored bandwidth utilization is the outbound bandwidth utilization at the interfaces; and wherein the bandwidth limit is an outbound bandwidth limit.

13. A data flow control device operative to prevent overloading any given interface in a plurality of interfaces, wherein the plurality of interfaces are associated with a virtual access link, comprising
a link monitoring module operative to
monitor bandwidth utilization at a plurality of interfaces associated with at least one routing system; and
compute a bandwidth limit for the virtual access link by:
selecting an interface of the plurality of interfaces having the highest bandwidth utilization relative to a corresponding bandwidth capacity of the selected interface;
computing a scaling factor comprising the ratio of the bandwidth capacity to the bandwidth utilization of the selected interface; and
multiplying the scaling factor by the aggregate bandwidth utilization detected across the plurality of interfaces; and
a flow control module operative to enforce the bandwidth limit in controlling data flows encountered at the plurality of interfaces associated with the virtual access link.

14. The data flow control device of claim 13 wherein the bandwidth utilization is the inbound bandwidth utilization observed at the plurality of interfaces, and the bandwidth limit is an inbound bandwidth limit.

15. The data flow control device of claim 13 wherein the bandwidth utilization is the outbound bandwidth utilization observed at the plurality of interfaces, and the bandwidth limit is an outbound bandwidth limit.

16. The data flow control device of claim 13 wherein the bandwidth utilization is based on the exponential weighted moving average of the inbound bandwidth utilization observed at the plurality of interfaces, and the bandwidth limit is an inbound bandwidth limit.

17. The data flow control device of claim 13 wherein the bandwidth utilization is based on the exponential weighted moving average of the outbound bandwidth utilization observed at the plurality of interfaces, and the bandwidth limit is an outbound bandwidth limit.

18. The data flow control device of claim 13 further comprising
a traffic classification database operative to associate traffic classes to data flows; and wherein the flow control module is operative to apply disparate bandwidth utilization policies to data flows depending on the respective traffic classes associated with the data flows.

19. A system operative to prevent overloading any given interface in a plurality of interfaces, wherein the plurality of interfaces are associated with a virtual access link, comprising
a routing system operative to route data packets received at a given interface; wherein the routing system comprises at least a first, second and third interface; wherein the first and second interfaces are respectively coupled to first and second access links; and
a data flow control device operatively connected to the routing system via the third interface;
wherein the data flow control device comprises:
a link monitoring module operative to
monitor bandwidth utilization at the first and second interfaces; and
compute a bandwidth limit for the virtual access link by:
selecting an interface of the plurality of interfaces having the highest bandwidth utilization relative to a corresponding bandwidth capacity of the selected interface;
computing a scaling factor comprising the ratio of the bandwidth capacity to the bandwidth utilization of the selected interface; and
multiplying the scaling factor by the aggregate bandwidth utilization detected across the plurality of interface; and a flow control module operative to apply the bandwidth limit in controlling data flows traversing the first and second access links.

20. The system of claim 19 wherein the bandwidth utilization is the inbound bandwidth utilization observed at the first and second interfaces, and the bandwidth limit is an inbound bandwidth limit.

21. The system of claim 19 wherein the bandwidth utilization is the outbound bandwidth utilization observed at the first and second interfaces, and the bandwidth limit is an outbound bandwidth limit.

* * * * *